United States Patent
Björklund et al.

(10) Patent No.: US 10,921,061 B2
(45) Date of Patent: *Feb. 16, 2021

(54) METHOD AND ARRANGEMENT FOR MONITORING CHARACTERISTICS OF A FURNACE PROCESS IN A FURNACE SPACE AND PROCESS MONITORING UNIT

(71) Applicant: OUTOTEC (FINLAND) OY, Espoo (FI)

(72) Inventors: Peter Björklund, Espoo (FI); Oskari Karhuvaara, Espoo (FI); Valtteri Sonninen, Helsinki (FI); Pekka Saari, Kauniainen (FI); Matti Luomala, Pori (FI)

(73) Assignee: OUTOTEC (FINLAND) OY, Espoo (FI)

( * ) Notice: Subject to any disclaimer, the term of this patent is extended or adjusted under 35 U.S.C. 154(b) by 274 days.

This patent is subject to a terminal disclaimer.

(21) Appl. No.: 15/758,224

(22) PCT Filed: Sep. 14, 2016

(86) PCT No.: PCT/FI2016/050637
§ 371 (c)(1),
(2) Date: Mar. 7, 2018

(87) PCT Pub. No.: WO2017/046453
PCT Pub. Date: Mar. 23, 2017

(65) Prior Publication Data
US 2018/0245851 A1 Aug. 30, 2018

(30) Foreign Application Priority Data
Sep. 15, 2015 (FI) .................................... 20155659

(51) Int. Cl.
*F27D 21/00* (2006.01)
*F27D 19/00* (2006.01)
(Continued)

(52) U.S. Cl.
CPC ........ *F27D 21/0014* (2013.01); *C21C 5/4673* (2013.01); *C21C 7/0025* (2013.01);
(Continued)

(58) Field of Classification Search
CPC .......... F27D 21/0014; F27D 2019/0003–0025; C21C 5/00–06; C21C 5/52–5252
See application file for complete search history.

(56) References Cited

U.S. PATENT DOCUMENTS 3,535,214 A * 10/1970 Winand .................... C25C 3/30
205/363
3,742,763 A 7/1973 Sczerba
(Continued)

FOREIGN PATENT DOCUMENTS

| CN | 203984580 U | 12/2014 |
|---|---|---|
| DE | 24 29 199 A1 | 4/1975 |

(Continued)

OTHER PUBLICATIONS

Office Action issued by the Chilean Patent Office in corresponding Chilean Patent Application No. 201800588 dated Jul. 15, 2019 (13 pages).

(Continued)

*Primary Examiner* — Michael A Laflame, Jr.
(74) *Attorney, Agent, or Firm* — Buchanan Ingersoll & Rooney PC

(57) ABSTRACT

Provided are a method and to an arrangement for monitoring characteristics of a furnace process in a furnace space limited by a furnace shell of a metallurgical furnace. The arrangement comprises a process monitoring unit having a
(Continued)

Figure 1:
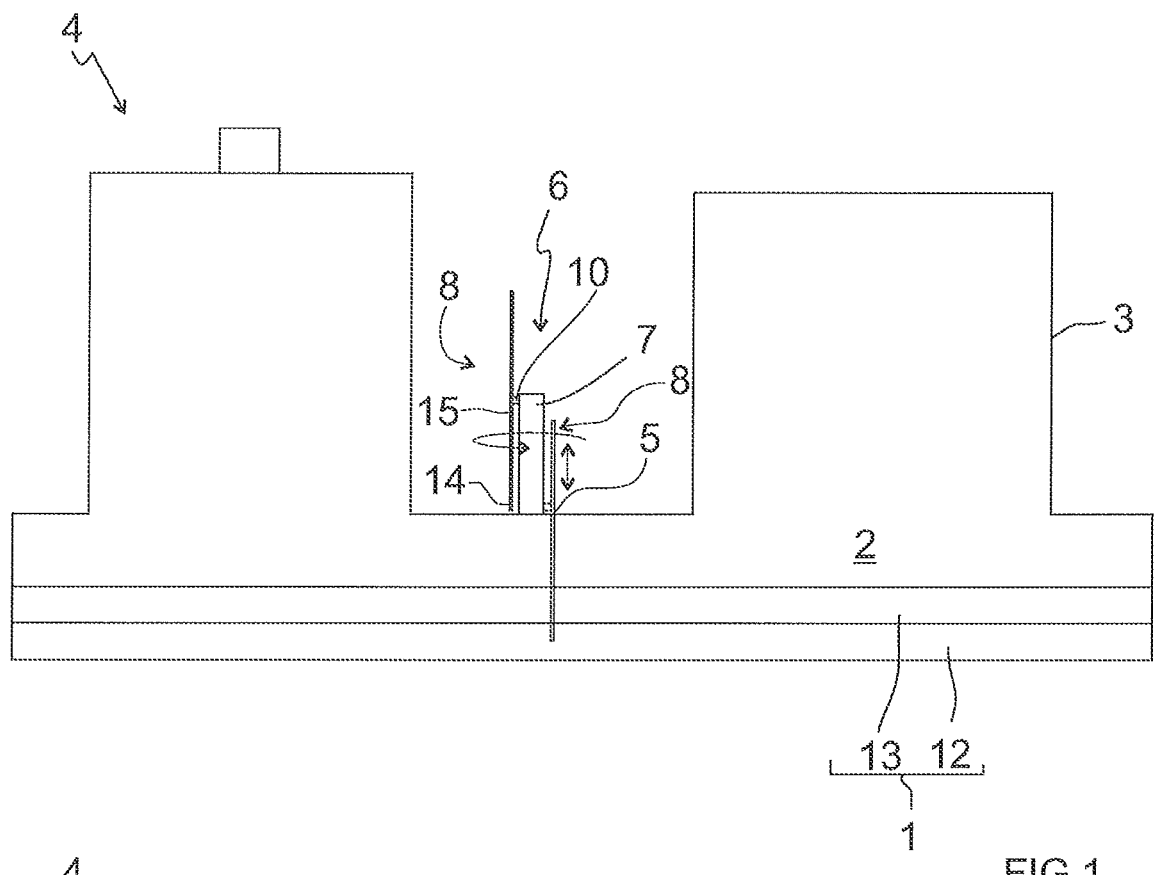

frame mounted by means of a mounting means on the metallurgical furnace outside the furnace space of the furnace shell. Also provided is a process monitoring unit for use in the method and/or in the arrangement.

22 Claims, 3 Drawing Sheets

(51) Int. Cl.
  *C21C 5/52*    (2006.01)
  *C21C 5/46*    (2006.01)
  *F27D 21/02*   (2006.01)
  *C21C 7/00*    (2006.01)
  *F27B 3/28*    (2006.01)
  *F27B 14/20*   (2006.01)
  *F27D 11/08*   (2006.01)

(52) U.S. Cl.
  CPC .............. *C21C 7/0037* (2013.01); *F27B 3/28* (2013.01); *F27B 14/20* (2013.01); *F27D 11/08* (2013.01); *F27D 19/00* (2013.01); *F27D 21/00* (2013.01); *F27D 21/02* (2013.01); *C21C 2005/5288* (2013.01); *Y02P 10/20* (2015.11)

(56) References Cited

U.S. PATENT DOCUMENTS

| | | | |
|---|---|---|---|
| 3,946,610 A * | 3/1976 | Sartorius | G01K 1/146 374/208 |
| 6,212,218 B1 | 4/2001 | Shver | |
| 6,490,312 B1 * | 12/2002 | Pleschiutschnigg | C21B 13/026 373/108 |
| 2010/0001443 A1 * | 1/2010 | Kroemmer | F23D 1/00 266/268 |
| 2012/0070136 A1 * | 3/2012 | Koelmel | H01L 21/67115 392/416 |
| 2012/0137757 A1 * | 6/2012 | Dams | C21C 5/4673 73/64.56 |
| 2013/0098202 A1 * | 4/2013 | Tsuge | C21C 5/5252 75/10.63 |
| 2014/0008846 A1 | 1/2014 | Collart | |
| 2014/0291901 A1 * | 10/2014 | Harada | F27D 15/00 266/78 |
| 2015/0330708 A1 * | 11/2015 | Brisson | C21C 5/52 75/10.12 |
| 2016/0282048 A1 * | 9/2016 | Wunsche | F27D 21/00 |

FOREIGN PATENT DOCUMENTS

| | | |
|---|---|---|
| DE | 27 53 161 A1 | 5/1979 |
| EP | 0 079 290 A1 | 5/1983 |
| EP | 2 682 483 A2 | 1/2014 |
| KR | 20010099116 A | 11/2001 |
| SU | 523648 A3 | 7/1976 |
| WO | 2006010208 A1 | 2/2006 |
| WO | 2011138629 A1 | 11/2011 |
| WO | WO 2015/046027 A1 | 4/2015 |
| WO | WO 2015/070316 A1 | 5/2015 |
| WO | 2017046451 A1 | 3/2017 |

OTHER PUBLICATIONS

Notification of the First Office Action issued by the State Intellectual Property Office of the People's Republic of China in corresponding Chinese Patent Application No. 201680051850.1 dated Dec. 11, 2018 (9 pages of the English translation).
Office Action issued by The Eurasian Patent Office in corresponding Eurasian Patent Application No. 201890461/31 dated Jun. 11, 2019 (5 pages including partial English translation).
International Search Report (PCT/ISA/210) dated Dec. 16, 2016, by the European Patent Office as the International Searching Authority for International Application No. PCT/FI2016/050637.
Written Opinion (PCT/ISA/237) dated Dec. 16, 2016, by the European Patent Office as the International Searching Authority for International Application No. PCT/FI2016/050637.
Notification of Transmittal of the International Preliminary Report on Patentability (PCT Rule 71.1) (Form PCT/IPEA/416) and International Preliminary Report on Patentability (PCT Article 36 and Rule 70) (Form PCT/IPEA/409) dated Oct. 6, 2017, by the European Patent Office for International Application No. PCT/FI2016/050637. (12 pages).
Finnish Search Report dated Jul. 26, 2016 and, issued by the Finnish Patent and Registration Office in the corresponding Finnish Patent Application No. 20155659. (1 page).
Agellis ELP, Electromagnetic Level Profile, Electromagnetic Furnace Profile System, Fast, Efficient & Accurate Level Measurements,(Aug. 25, 2013), https://www.sidermet.co.za/images/document/, (X1), (2 pages).
Electromagnetic Level Measurements, (Aug. 25, 2013), http://sidermet.co.za/products/electromagnetic-level-measurement, https://web.archive.org/web/20130825114354/http://sidermet.co.za/products/electromagnetic-level-measurement, (X1a), (2 pages).
Print out of: https://web.archive.org/web/20130825114354id_/http://sidermet.co.za/products/electromagnetic-level-measurement, (Aug. 25, 2013), (X1b), (6 pages).
Brogden et al., "Electromagnetic level profile measurement system at Vale ONCA PUMA ferronickel smelter improves safety and enhances process control decision making," The thirteenth International Ferroalloys Congress, Efficient Technologies in Ferroalloy Industry, (Jun. 9-13, 2013), pp. 215-222.
Flexible Systems—provac, http://www.provac.se:80/flexible_systems.html, https://web.archive .org/web/20140207153842/http://www.provac.se:80/flexible_systems.html,(X3) and https://www.provac.se/userFiles/myImages/animation/Animation168.qif, (X3a) (Jul. 12, 2013), (10 pages).

* cited by examiner

METHOD AND ARRANGEMENT FOR MONITORING CHARACTERISTICS OF A FURNACE PROCESS IN A FURNACE SPACE AND PROCESS MONITORING UNIT

FIELD OF THE INVENTION

The invention relates to a method for monitoring characteristics of a furnace process in a furnace space limited by a furnace shell of a metallurgical furnace as defined in the preamble of independent claim 1.

The invention also relates to an arrangement for monitoring characteristics of a furnace process in a furnace space limited by a furnace shell of a metallurgical furnace as defined in the preamble of independent claim 12.

The invention relates also to a process monitoring unit for use in the method and/or in the arrangement.

OBJECTIVE OF THE INVENTION

The object of the invention is to provide a method and an arrangement for in a repeatable manner monitoring characteristics of a furnace process in a furnace space limited by a furnace shell of a metallurgical furnace and to provide a process monitoring unit for use in the method or in the arrangement.

SHORT DESCRIPTION OF THE INVENTION

The method for monitoring characteristics of a furnace process in a furnace space limited by a furnace shell of a metallurgical furnace of the invention is characterized by the definitions of independent claim 1.

Preferred embodiments of the method are defined in the dependent claims 2 to 11.

The arrangement for monitoring characteristics of a furnace process in a furnace space limited by a furnace shell of a metallurgical furnace of the invention is correspondingly characterized by the definitions of independent claim 12.

Preferred embodiments of the arrangement are defined in the dependent claims 13 to 22.

The method and the arrangement and the process monitoring unit allows a repeatable way of monitoring characteristics of a furnace process in a furnace space limited by a furnace shell of a metallurgical furnace, for example such that the temperature measurement is always done at a standard distance from the surface of the melt level, such that a sounding rod always stays in the furnace space for the same amount of time, such that a camera is inserted into the furnace space to the same spot and stays inside the furnace space for the same length of time, such that a dust sampling device is inserted into the furnace space to the same spot, such that a melt sampling device is inserted into the furnace space to the same spot, such that a gas sampling device is inserted into the furnace space to the same spot, and/or such that an automatic melt level detecting sounding rod always moves with the same velocity inside the furnace space.

LIST OF FIGURES

Figure 2:
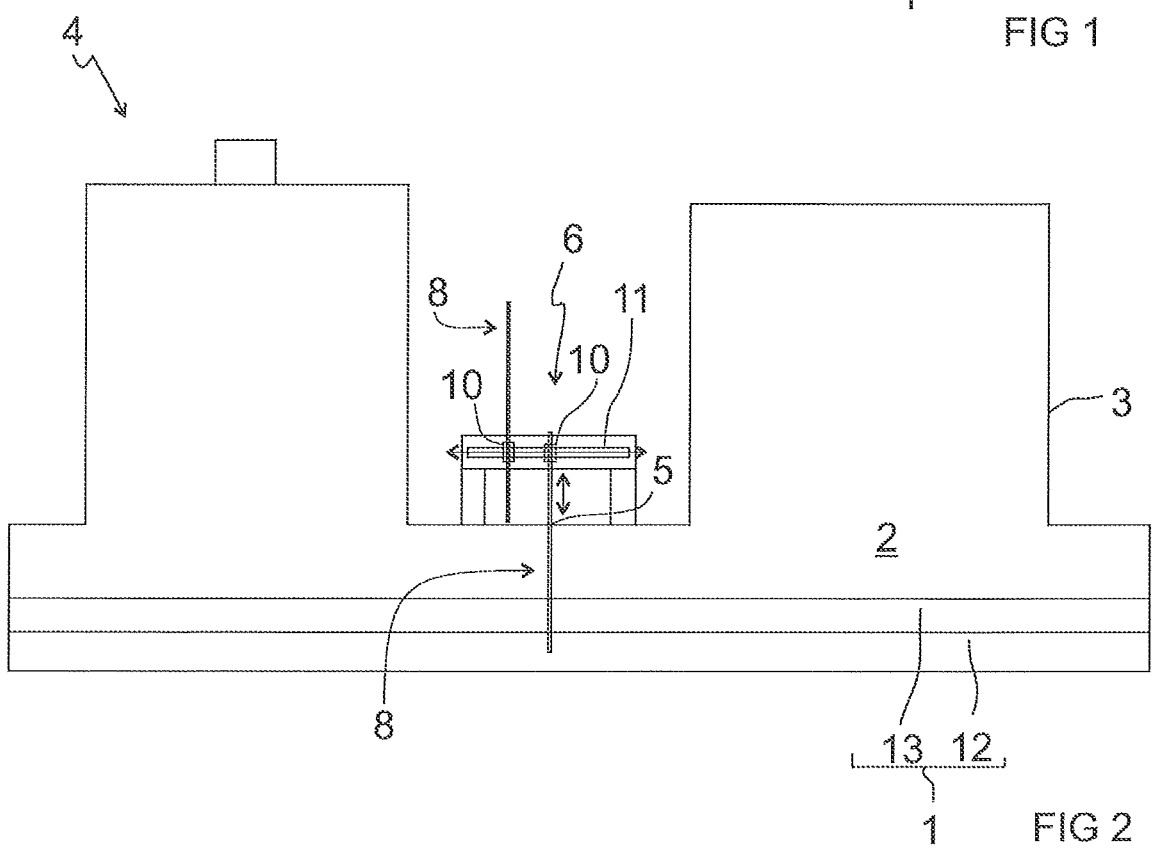
Figure 3:
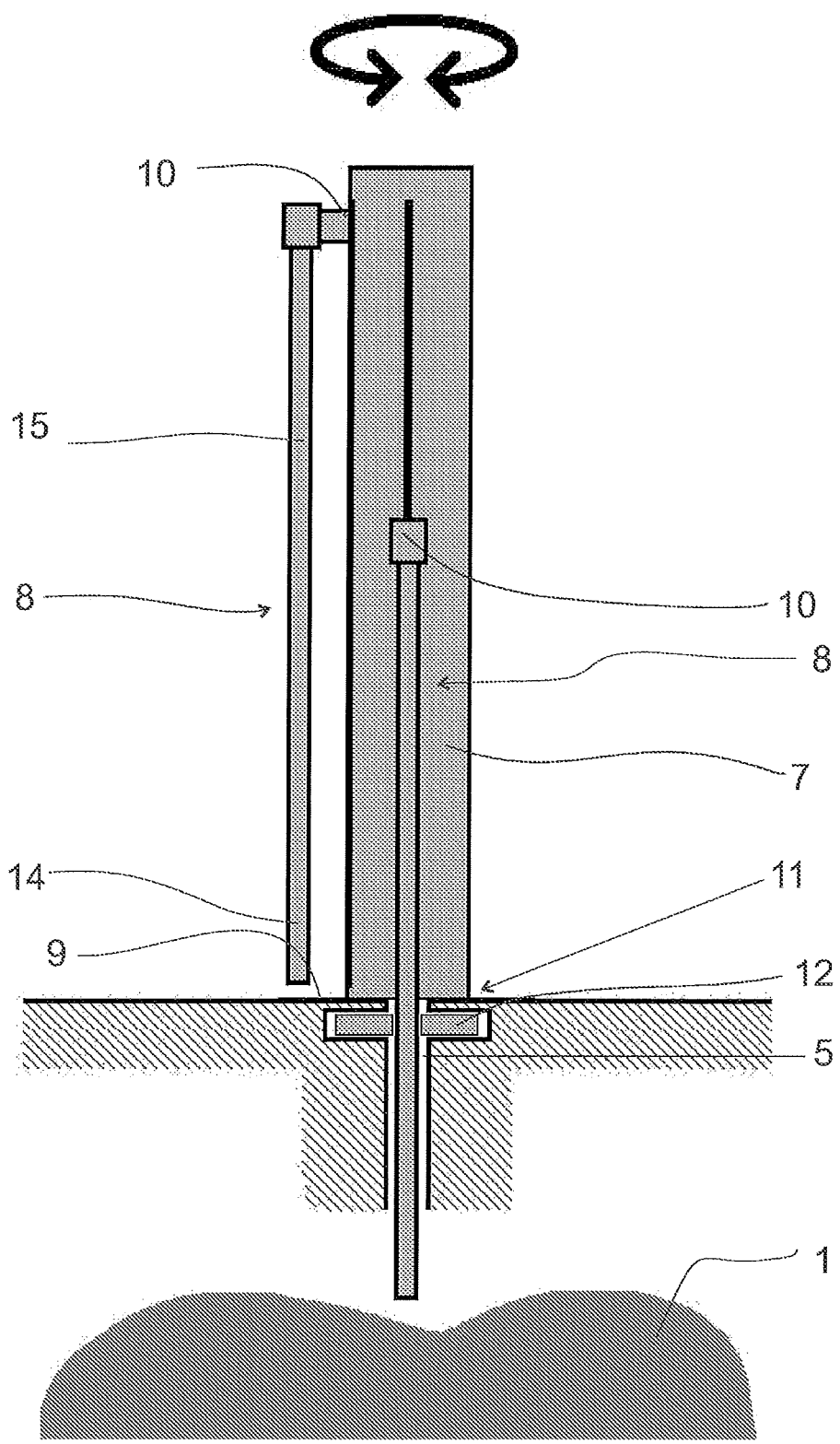
Figure 4:
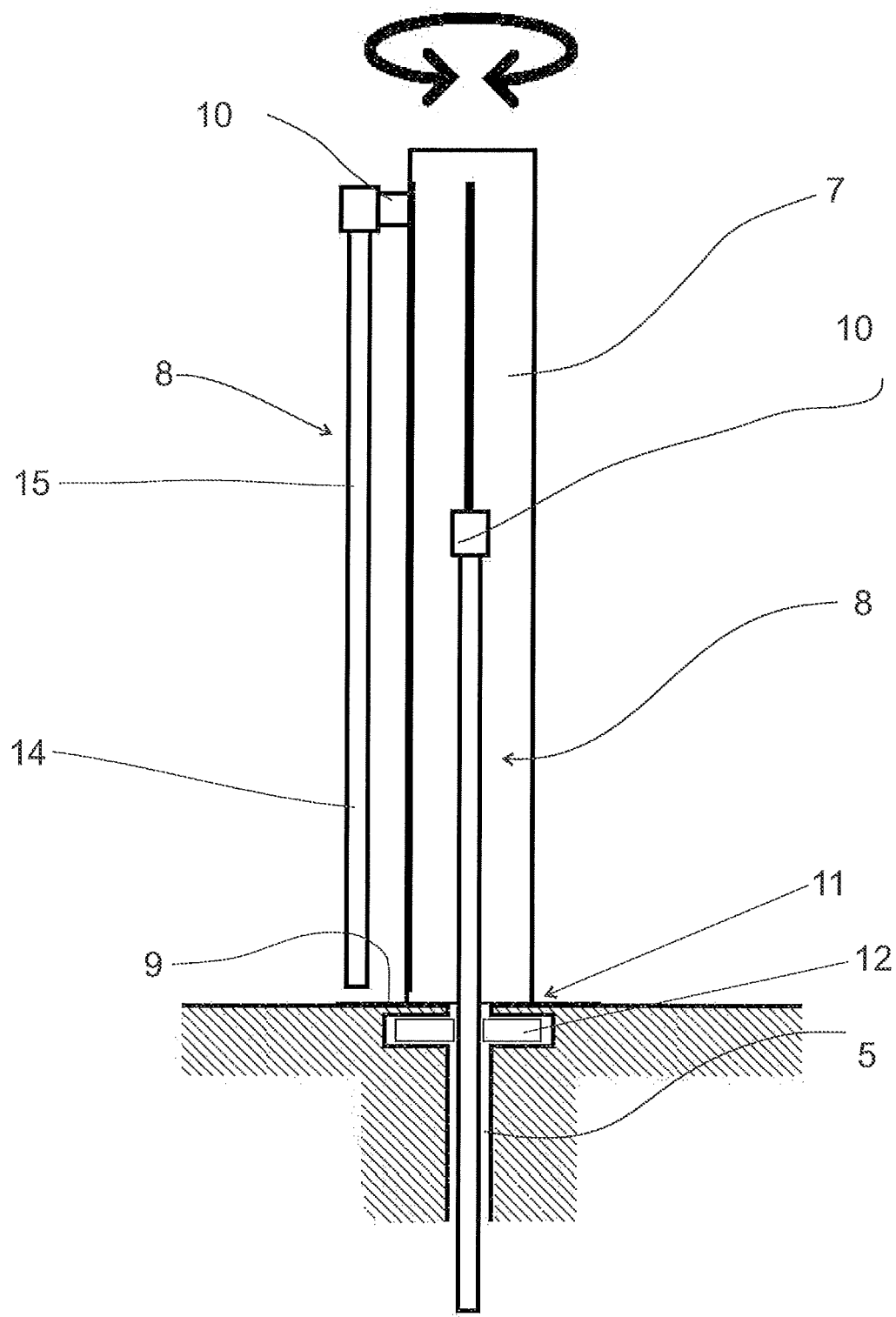

In the following the invention will described in more detail by referring to the figures, which FIG. 1 shows a metallurgical furnace that is provided with a process monitoring unit according to a first embodiment, FIG. 2 shows a metallurgical furnace that is provided with a process monitoring unit according to a second embodiment, and FIGS. 3 and 4 shows the function principle of process monitoring unit according to a first embodiment.

DETAILED DESCRIPTION OF THE INVENTION

The invention relates to method and to an arrangement for monitoring characteristics of a furnace process in a furnace space 2 limited by a furnace shell 3 of a metallurgical furnace 4 and to a process monitoring unit for use in the method and/or in the arrangement.

The metallurgical furnace 4 can for example be a suspension smelting furnace, an electric arc furnace, a top submerged lance furnace, or a bottom blown furnace. FIGS. 1 and 2 shows a metallurgical furnace 4 that is in the form of a suspension smelting furnace.

First the method for monitoring characteristics of a furnace process in a furnace space 2 limited by a furnace shell 3 of a metallurgical furnace 4 and some variants and embodiments of the method will be described in greater detail.

The method comprises a first providing step for providing a furnace aperture 5 extending through the furnace shell 3 of the metallurgical furnace 4.

The method comprises a second providing step for providing a process monitoring unit 6 comprising a frame 7, at least one linearly movable monitoring device 8 that is configured to move linearly with respect to the frame 7, mounting means 9 for mounting the frame 7 on the metallurgical furnace 4 outside the furnace space 2, first moving means 10 for moving said at least one linearly movable monitoring device 8 with respect to the frame 7, and second moving means 11 for moving said first moving means 10 between a first position and a second position with respect to the mounting means 9.

Said at least one linearly movable monitoring device 8 is preferably, but not necessarily, configured to move linearly for a predefined distance with respect to the frame 7.

The method comprises a mounting step for mounting the process monitoring unit 6 by means of the mounting means 9 on the metallurgical furnace 4 outside the furnace space 2.

The method comprises a first moving step for moving said at least one linearly movable monitoring device 8 by means of the second moving means 11 with respect to the mounting means 9 from a first position, where said at least one linearly movable monitoring device 8 is unable linearly move through the furnace aperture 5 in the furnace shell 3, into a second position, where said at least one linearly movable monitoring device 8 is able linearly move through the furnace aperture 5 in the furnace shell 3.

The method comprises a second moving step for moving said at least one linearly movable monitoring device 8 by means of the first moving means 10 in said second position linearly through the furnace aperture 5 in the furnace shell 3 at least partly into the furnace space 2 and possible partly into furnace melt 1 in the furnace space 2, and a monitoring step for monitoring characteristics of a furnace process in the furnace space 2.

The method comprises a third moving step for moving said at least one linearly movable monitoring device 8 by means of the first moving means 10 in said second position through the furnace aperture 5 in the furnace shell 3 out of the furnace space 2.

The method comprises a fourth moving step for moving said at least one linearly movable monitoring device 8 by means of the second moving means 11 with respect to the mounting means 9 from said second position, where said at least one linearly movable monitoring device 8 is able linearly move through the furnace aperture 5 in the furnace shell 3, into a third position, where said at least one linearly movable monitoring device 8 is unable linearly move through the furnace aperture 5 in the furnace shell 3.

The third position may be the same as the first position or position different from the first position.

The method may comprise providing a process monitoring unit 6 in the second providing step comprising a steering unit (not shown in the drawings) for automatically monitoring at least the first moving means 10 and the second moving means 11, and the method may include automatically performing the first moving step, the second moving step, the third moving step, and the fourth moving step as controlled by the steering unit of the process monitoring unit 6.

The process monitoring unit 6 can be mounted in the mounting step by means of the mounting means 9 on at least one of a furnace roof of the furnace shell 3 of the metallurgical furnace 4, as shown in FIGS. 1 and 2, or on a furnace steel structure (not illustrated) above a furnace roof of the furnace shell 3 of the metallurgical furnace 4.

The method may include a third providing step for providing a hatch mechanism 12 for closing the furnace aperture 5 extending through the furnace shell 3, and a first connecting step for functionally connecting the hatch mechanism 12 with the process monitoring unit 6 so that the hatch mechanism 12 is configured to open the furnace aperture 5 when the second moving means 11 of the process monitoring unit 6 moves said at least one linearly movable monitoring device 8 into the second position and so that the hatch mechanism 12 is configured to close the furnace aperture 5 when the second moving means 11 of the process monitoring unit 6 moves said at least one linearly movable monitoring device 8 from the second position into the third position.

The method may include moving said at least one linearly movable monitoring device 8 between the first position and the second position in the first moving step by rotating said first moving means 10 with respect to the mounting means 9 and between the second position and the third position in the fourth moving step by rotating said first moving means 10 with respect to the mounting means 9. FIGS. 1, 3 and 4 shows such embodiments.

The method may include moving said at least one linearly movable monitoring device 8 between the first position and the second position in the first moving step linearly by moving said first moving means 10 linearly with respect to the mounting means 9, and between the second position and the third position in the fourth moving step linearly by moving said first moving means 10 linearly with respect to the mounting means 9. FIG. 2 shows such embodiment.

In an embodiment of the method, the process monitoring unit 6 that is provided in the second providing step comprises a linearly movable monitoring device 8 comprising a monitoring apparatus 14 and an elongated rod 15 having a distal end to which the monitoring apparatus 14 is attached.

In an embodiment of the method, the process monitoring unit 6 that is provided in the second providing step comprises a linearly movable monitoring device 8 comprising a monitoring apparatus 14 in the form of at least one of a thermometer or a optical pyrometer configured to measure the temperature of the furnace melt 1 in the furnace space 2 and an elongated rod 15 having a distal end to which the monitoring apparatus 14 in the form of a thermometer is attached. The monitoring step of this embodiment of the method comprises a temperature measuring step for measuring the temperature of the furnace melt 1 in the furnace space 2.

In an embodiment of the method, the process monitoring unit 6 is provided in the second providing step comprise a linearly movable monitoring device 8 comprising a monitoring apparatus 14 in the form of a sampling chamber configured to measure the liquidus temperature of the furnace melt 1 in the furnace space 2 and an elongated rod 15 having a distal end to which the monitoring apparatus 14 in the form of a sampling chamber is attached. The monitoring step of this embodiment of the method comprise monitoring liquidus temperature measuring step for measuring the liquidus temperature of the furnace melt 1 in the furnace space 2 in the monitoring step by taking a sample of the furnace melt 1 in the furnace space 2.

In an embodiment of the method, the process monitoring unit 6 that is provided in the second providing step comprise a linearly movable monitoring device 8 comprising a monitoring apparatus 14 in the form of a sounding rod configured to measure the level of the furnace melt 1 in the furnace space 2 and an elongated rod 15 having distal section forming the sounding rod. The monitoring step of this embodiment of the method comprise a melt level measuring step for measuring the level of the furnace melt 1 in the furnace space 2 in the monitoring step by at least partly submerging the distal section of the elongated rod 15 into the furnace melt 1 in the furnace space 2.

In an embodiment of the method, the process monitoring unit 6 that is provided in the second providing step comprise a linearly movable monitoring device 8 comprising a monitoring apparatus 14 in the form of a sounding rod configured to measure the thickness of as slag layer 13 of the furnace melt 1 in the furnace space 2 and/or the thickness of a molten metal containing layer 12 below the slag layer 13 of the furnace melt 1 in the furnace space 2 and an elongated rod 15 having distal section forming the sounding rod. The monitoring step of this embodiment of the method comprise a slag layer thickness measuring step for measuring the thickness of as slag layer 13 of the furnace melt 1 in the furnace space 2 and/or a molten metal layer thickness measuring step for measuring the thickness of a molten metal containing layer 12 below the slag layer 13 of the furnace melt 1 in the furnace space 2 in the monitoring step by at least partly submerging the distal section of the elongated rod 15 into the furnace melt 1 in the furnace space 2.

In an embodiment of the method, the process monitoring unit 6 that is provided in the second providing step comprise a linearly movable monitoring device 8 comprising a monitoring apparatus 14 in the form of a camera configured to take pictures of the furnace melt 1 in the furnace space 2 and an elongated rod 15 having a distal end to which the monitoring apparatus 14 in the form of a camera is attached. The monitoring step of this embodiment of the method comprise a picture taking step for taking pictures of the furnace melt 1 in the furnace space 2.

In an embodiment of the method, the process monitoring unit 6 that is provided in the second providing step comprise a linearly movable monitoring device 8 comprising a dust sampling device configured to take dust samples from the furnace space 2. The monitoring step of this embodiment of the method comprises a dust sampling step for taking dust samples from the furnace space 2.

In an embodiment of the method, the process monitoring unit 6 that is provided in the second providing step comprise a linearly movable monitoring device 8 comprising a melt sampling device configured to take melt samples from the furnace melt 1 inside the furnace space 2. The monitoring step of this embodiment of the method comprise a melt sampling step for taking samples from the furnace melt 1 inside the furnace space 2.

In an embodiment of the method, the process monitoring unit 6 that is provided in the second providing step comprise a linearly movable monitoring device 8 comprising a gas sampling device configured to take gas samples from the furnace space 2. The monitoring step of this embodiment of the method comprises a gas sampling step for taking gas samples from gas inside the furnace space 2.

In an embodiment of the method, the process monitoring unit 6 that is provided in the second providing step comprise a linearly movable injection device (not marked with a reference numeral) configured to inject additives such as coke, pulverized coal, concentrate mixture, silica, lime, limestone into the furnace melt 1 inside the furnace space 2. This embodiment of the method comprises an injection step for injecting additives into the furnace melt 1 inside the furnace space 2.

In an embodiment of the method, the process monitoring unit 6 that is provided comprises at least one of an electric motor, a pneumatic cylinder and a linear motor for linearly moving said at least one linearly movable monitoring device 8 between the first position and the second position in the first moving step and between the second position and the third position in the fourth moving step.

In an embodiment of the method, the process monitoring unit 6 that is provided comprises at least one of an electric motor, a pneumatic cylinder and a linear motor for linearly moving said at least one linearly movable monitoring device 8 through the aperture 5 in the furnace shell 3.

In an embodiment of the method, the method comprises a connecting step for functionally connecting the process monitoring unit 6 with a process control system of the metallurgical furnace 4.

Next the arrangement for monitoring characteristics of a furnace process in a furnace space 2 limited by a furnace shell 3 of a metallurgical furnace 4 and some variants and embodiments of the arrangement will be described in greater detail.

The arrangement comprises a process monitoring unit 6 having a frame 7 mounted by means of a mounting means 9 on the metallurgical furnace 4 outside the furnace space 2.

The arrangement comprises a furnace aperture 5 extending through the furnace shell 3 of the metallurgical furnace 4.

The process monitoring unit 6 comprises at least one linearly movable monitoring device 8 that is configured to move linearly with respect to the frame 7. Said at least one linearly movable monitoring device 8 is preferably, but not necessarily, configured to move linearly for a predefined distance with respect to the frame 7. The process monitoring unit 6 comprises first moving means 10 for moving said at least one linearly movable monitoring device 8 linearly with respect to the frame 7.

The monitoring means comprises second moving means 11 for moving the first moving means 10 with respect to the mounting means 9 between a second position, where the first moving means 10 is able linearly move said at least one linearly movable monitoring device 8 linearly through the furnace aperture 5 in the furnace shell 3, and a first position, where the first moving means 10 is unable to move said at least one linearly movable monitoring device 8 linearly through the furnace aperture 5 in the furnace shell 3.

The third position may be the same as the first position or position different from the first position.

The process monitoring unit 6 may comprise a steering unit (not shown in the drawings) for automatically monitoring at least the first moving means 10 and the second moving means 11.

In the embodiments shown in the figures, the process monitoring unit 6 comprises two linearly movable monitoring devices 8, which are configured to move linearly with respect to the frame 7 and each of the linearly movable monitoring devices 8 are provided with first moving means 10 for moving the linearly movable monitoring device 8 with respect to the frame 7. If the process monitoring unit 6 comprises several linearly movable monitoring devices 8, such as two linearly movable monitoring devices 8, each of the linearly movable monitoring devices 8 are preferably, but not necessarily, configured to monitor a respective characteristic of a furnace process in the furnace space 2.

The process monitoring unit 6 may be mounted on at least one of a furnace roof of the furnace shell 3, as shown in FIGS. 1 and 2, or a furnace steel structure above a furnace roof of the furnace shell 3.

The arrangement may comprise a hatch mechanism 12 for closing the furnace aperture 5, and the hatch mechanism 12 may be functionally connected with the process monitoring unit 6 so that the hatch mechanism 12 is configured to open the furnace aperture 5 when the second moving means 11 of the process monitoring unit 6 moves said at least one linearly movable monitoring device 8 into the second position and so that the hatch mechanism 12 is configured to close the furnace aperture 5 when the second moving means 11 of the process monitoring unit 6 moves said at least one linearly movable monitoring device 8 from the second position.

The second moving means 11 may be configured to move the first moving means 10 between the first position and the second position by rotating.

The second moving means 11 may be configured to move the first moving means 10 between the first position and the second position linearly.

The process monitoring unit 6 may comprise a linearly movable monitoring device 8 comprising a monitoring apparatus 14 and an elongated rod 15 having a distal end to which the monitoring apparatus 14 is attached The process monitoring unit 6 may comprise a linearly movable monitoring device 8 comprising a monitoring apparatus 14 in the form of a thermometer configured to measure the temperature of the furnace melt 1 in the furnace space 2 and an elongated rod 15 having a distal end to which the monitoring apparatus 14 in the form of a thermometer is attached.

The process monitoring unit 6 may comprise a linearly movable monitoring device 8 comprising a monitoring apparatus 14 in the form of a sampling chamber configured to measure the liquidus temperature of the furnace melt 1 in the furnace space 2 and an elongated rod 15 having a distal end to which the monitoring apparatus 14 in the form of a sampling chamber is attached.

The process monitoring unit 6 may comprise a linearly movable monitoring device 8 comprising a monitoring apparatus 14 in the form of a sounding rod configured to measure the level of the furnace melt 1 in the furnace space 2 and an elongated rod 15 having a distal section forming the sounding rod.

The process monitoring unit 6 may comprise a linearly movable monitoring device 8 comprising a monitoring apparatus 14 in the form of a sounding rod configured to measure the thickness of as slag layer 13 of the furnace melt 1 in the furnace space 2 and/or the thickness of a molten metal containing layer 12 below the slag layer 13 of the furnace melt 1 in the furnace space 2 and an elongated rod 15 having distal section forming the sounding rod.

The process monitoring unit 6 may comprise a linearly movable monitoring device 8 comprising a monitoring apparatus 14 in the form of a camera configured to take pictures of the furnace melt 1 in the furnace space 2 and an elongated rod 15 having a distal end to which the monitoring apparatus 14 in the form of a camera is attached.

The process monitoring unit 6 may comprise a linearly movable monitoring device 8 comprising a dust sampling device configured to take dust samples from the furnace space 2.

The process monitoring unit 6 may comprise a linearly movable monitoring device 8 comprising a melt sampling device configured to take melt samples from the furnace melt 1 inside the furnace space 2.

The process monitoring unit 6 may comprise a linearly movable monitoring device 8 comprising a gas sampling device configured to take gas samples from the furnace space 2.

The process monitoring unit 6 may comprise a linearly movable injection device (not marked with a reference numeral) configured to inject additives such as coke, pulverized coal, concentrate mixture, silica, lime, limestone into the furnace melt 1 inside the furnace space 2.

The process monitoring unit 6 may comprise at least one of an electric motor, a pneumatic cylinder and a linear motor for linearly moving said at least one linearly movable monitoring device 8 through the aperture 5 in the furnace shell 3.

The process monitoring unit 6 may be functionally connected with a process control system of the metallurgical furnace 4.

Next the process monitoring unit 6 for use in the method or in the arrangement and some variants and embodiments of the process monitoring unit 6 will be described in greater detail.

The process monitoring unit 6 comprises mounting means 9 for mounting a frame 7 of the process monitoring unit 6 outside a furnace space 2 limited by a furnace shell 3 of a metallurgical furnace 4.

The process monitoring unit 6 comprises at least one linearly movable monitoring device 8 that is configured to move linearly with respect to the frame 7. The monitoring means comprises first moving means 10 for moving said at least one linearly movable monitoring device 8 with respect to the frame 7. Said at least one linearly movable monitoring device 8 is preferably, but not necessarily, configured to move linearly for a predefined distance with respect to the frame 7.

In the embodiments shown in the figures, the process monitoring unit 6 comprises two linearly movable monitoring devices 8, which are configured to move linearly with respect to the frame 7 and each of the linearly movable monitoring devices 8 are provided with first moving means 10 for moving the linearly movable monitoring device 8 with respect to the frame 7. If the process monitoring unit 6 comprises several linearly movable monitoring devices 8, such as two linearly movable monitoring devices 8, each of the linearly movable monitoring devices 8 are preferably, but not necessarily, configured to monitor a respective characteristic of a furnace process in the furnace space 2.

The monitoring means comprises second moving means 11 for moving said first moving means 10 with respect to the mounting means 9 between a first position and a second position. The second moving means 11 is preferably, but not necessarily, configured to move said first moving means 10 with respect to the mounting means 9 between a first position and a second position in a state, when said at least one linearly movable monitoring device 8 is positioned fully outside the furnace space 2.

The second moving means 11 may, as in the first embodiment shown in FIGS. 1, 3 and 4, be configured to move said first moving means 10 frame 7 between the first position and the second position with respect to the mounting means 9 by rotating the frame 7 with respect to the mounting means 9.

The second moving means 11 may, as in the first embodiment shown in FIG. 2, be configured to move said first moving means 10 between the first position and the second position linearly with respect to the mounting means 9.

The process monitoring unit 6 may comprise a linearly movable monitoring device 8 comprising a monitoring apparatus 14 and an elongated rod 15 having a distal end to which the monitoring apparatus 14 is attached The process monitoring unit 6 may comprise a linearly movable monitoring device 8 comprising a monitoring apparatus 14 in the form of a thermometer configured to measure the temperature of the furnace melt 1 in the furnace space 2 and an elongated rod 15 having a distal end to which the monitoring apparatus 14 in the form of a thermometer is attached.

The process monitoring unit 6 may comprise a linearly movable monitoring device 8 comprising a monitoring apparatus 14 in the form of a sampling chamber configured to measure the liquidus temperature of the furnace melt 1 in the furnace space 2 and an elongated rod 15 having a distal end to which the monitoring apparatus 14 in the form of a sampling chamber is attached.

The process monitoring unit 6 may comprise a linearly movable monitoring device 8 comprising a monitoring apparatus 14 in the form of a sounding rod configured to measure the level of the furnace melt 1 in the furnace space 2 and an elongated rod 15 having a distal section forming the sounding rod.

The process monitoring unit 6 may comprise a linearly movable monitoring device 8 comprising a monitoring apparatus 14 in the form of a sounding rod configured to measure the thickness of as slag layer 13 of the furnace melt 1 in the furnace space 2 and/or the thickness of a molten metal containing layer 12 below the slag layer 13 of the furnace melt 1 in the furnace space 2 and an elongated rod 15 having distal section forming the sounding rod.

The process monitoring unit 6 may comprise a linearly movable monitoring device 8 comprising a monitoring apparatus 14 in the form of a camera configured to take pictures of the furnace melt 1 in the furnace space 2 and an elongated rod 15 having a distal end to which the monitoring apparatus 14 in the form of a camera is attached.

The process monitoring unit 6 may comprise a linearly movable monitoring device 8 comprising a dust sampling device configured to take dust samples from the furnace space 2.

The process monitoring unit 6 may comprise a linearly movable monitoring device 8 comprising a melt sampling device configured to take melt samples from the furnace melt 1 inside the furnace space 2.

The process monitoring unit 6 may comprise a linearly movable monitoring device 8 is comprising a gas sampling device configured to take gas samples from the furnace space 2.

The process monitoring unit 6 may comprise a linearly movable injection device (not marked with a reference numeral) configured to inject additives such as coke, pulverized coal, concentrate mixture, silica, lime, limestone into the furnace melt 1 inside the furnace space 2.

The process monitoring unit 6 may comprise at least one of an electric motor, a pneumatic cylinder and a linear motor for linearly moving said at least one linearly movable monitoring device 8 through the aperture 5 in the furnace shell 3.

The process monitoring unit 6 comprises at least one of an electric motor, a pneumatic cylinder and a linear motor for moving the frame 7 with respect to the mounting means 9.

The process monitoring unit 6 comprises at least one of an electric motor, a pneumatic cylinder and a linear motor for linearly moving said at least one linearly movable monitoring device 8 with respect to the frame 7.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method for monitoring characteristics of a furnace process in a furnace space limited by a furnace shell of a metallurgical furnace comprising:
    a first providing step for providing a furnace aperture extending through the furnace shell,
    a second providing step for providing a process monitoring unit comprising a frame, a plurality of linearly movable monitoring devices each configured to move linearly with respect to the frame, wherein each of said plurality of linearly movable monitoring devices is configured to monitor a respective characteristic of said furnace process in the furnace space, a plurality of first moving means each configured to linearly move one linearly movable monitoring device of said plurality of linearly movable monitoring devices with respect to the frame, and second moving means for moving each of said plurality of first moving means between a first position and a second position with respect to the furnace shell,
    a mounting step for mounting the process monitoring unit on the metallurgical furnace outside the furnace space and on at least one of a furnace roof or a furnace steel structure above the furnace roof of the furnace shell,
    a first moving step for moving one first moving means of said plurality of first moving means by means of the second moving means with respect to the furnace shell from the first position into the second position, where said one first moving means of said plurality of first moving means is able to move one linearly movable monitoring device of said plurality of linearly movable monitoring devices linearly through the furnace aperture in the furnace shell,
    a second moving step for moving said one linearly movable monitoring device of said plurality of linearly movable monitoring devices by means of said one first moving means of said plurality of first moving means in said second position vertically through the furnace aperture in the furnace shell at least partly into the furnace space,
    a monitoring step for monitoring characteristics of the furnace process in the furnace space by means of said one linearly movable monitoring device of said plurality of linearly movable monitoring devices,
    a third moving step for moving said one linearly movable monitoring device of said plurality of linearly movable monitoring devices by means of said one first moving means of said plurality of first moving means in said second position linearly through the furnace aperture in the furnace shell out of the furnace space, and
    a fourth moving step for moving said one first moving means of said plurality of first moving means by means of the second moving means with respect to the furnace shell from the second position into a third position, where said one first moving means of said plurality of first moving means is unable to linearly move said one linearly movable monitoring device of said plurality of linearly movable monitoring devices linearly through the furnace aperture in the furnace shell.

2. The method according to claim 1, further comprising
    a third providing step for providing a hatch mechanism for closing the furnace aperture, and
    a first connecting step for functionally connecting the hatch mechanism with the process monitoring unit so that the hatch mechanism is configured to open the furnace aperture when the second moving means of the process monitoring unit moves the first moving means into the second position and so that the hatch mechanism is configured to close the furnace aperture when the second moving means of the process monitoring unit moves the first moving means from the second position.

3. The method according to claim 1, wherein
    moving the second moving means between the first position and the second position is by rotating.

4. The method according to claim 1, wherein
    said plurality of linearly movable monitoring devices of the process monitoring unit that is provided in the second providing step comprises a linearly movable monitoring device comprising a thermometer or optical pyrometer configured to measure the temperature of the furnace melt in the furnace space, and
    the monitoring step comprises a temperature measuring step for measuring the temperature of the furnace melt in the furnace space.

5. The method according to claim 1, wherein
    said plurality of linearly movable monitoring devices of the process monitoring unit that is provided in the second providing step comprises a linearly movable monitoring device comprising a sampling chamber configured to measure the liquidus temperature of the furnace melt in the furnace space, and
    the monitoring step comprises a liquidus temperature measuring step for measuring the liquidus temperature of the furnace melt in the furnace space.

6. The method according to claim 1, wherein
    said plurality of linearly movable monitoring devices of the process monitoring unit that is provided in the second providing step comprises a linearly movable monitoring device comprising a sounding rod configured to measure the level of the furnace melt in the furnace space, and
    the monitoring step comprises a melt level measuring step for measuring the level of the furnace melt in the furnace space.

7. The method according to claim 1, wherein
    said plurality of linearly movable monitoring devices of the process monitoring unit that is provided in the second providing step comprises a linearly movable monitoring device comprising a camera configured to take pictures inside the furnace space, and
    the monitoring step comprises a picture taking step for taking pictures inside the furnace space.

8. The method according to claim 1, wherein
said plurality of linearly movable monitoring devices of the process monitoring unit that is provided in the second providing step comprises a linearly movable monitoring device configured to take dust samples from the furnace space, and
the monitoring step comprises a dust sampling step for taking dust samples from the furnace space.

9. The method according to claim 1, wherein
said plurality of linearly movable monitoring devices of the process monitoring unit that is provided in the second providing step comprises a linearly movable monitoring device configured to take melt samples from the furnace melt inside the furnace space, and
the monitoring step comprises a melt sampling step for taking samples from the furnace melt inside the furnace space.

10. The method according to claim 1, wherein
said plurality of linearly movable monitoring devices of the process monitoring unit that is provided in the second providing step comprises a linearly movable monitoring device configured to take gas samples from the furnace space, and
the monitoring step comprises a gas sampling step for taking gas samples from gas inside the furnace space.

11. The method according to claim 1, wherein
the process monitoring unit that is provided in the second providing step comprises a linearly movable injection device configured to inject at least one additive selected from the group consisting of coke, pulverized coal, concentrate mixture, silica, lime, and limestone into the furnace melt inside the furnace space, and
an injection step for injecting additives into the furnace melt inside the furnace space.

12. An arrangement for monitoring characteristics of a furnace process in a furnace space limited by a furnace shell of a metallurgical furnace comprising:
a process monitoring unit having a frame mounted on the metallurgical furnace outside the furnace space of the furnace shell wherein the process monitoring unit comprises a plurality of linearly movable monitoring devices each configured to move linearly with respect to the frame and each configured to monitor a respective characteristic of said furnace process in the furnace space,
a plurality of first moving means each configured to move one linearly movable monitoring device of said plurality of linearly movable monitoring devices with respect to the frame,
a furnace aperture extending through the furnace shell,
second moving means for moving said plurality of first moving means with respect to the furnace shell between a first position, where one first moving means of said plurality of first moving means is able to move one linearly movable monitoring device of said plurality of linearly movable monitoring devices vertically through the furnace aperture in the furnace shell, and a second position, where said one first moving means of said plurality of first moving means is unable to move said one linearly movable monitoring device of said plurality of linearly movable monitoring devices linearly through the furnace aperture in the furnace shell, and wherein
the process monitoring unit is mounted on at least one of a furnace roof of the furnace shell or a furnace steel structure above a furnace roof of the furnace shell.

13. The arrangement according to claim 12, further comprising
a hatch mechanism for closing the furnace aperture wherein the hatch mechanism is functionally connected with the process monitoring unit so that the hatch mechanism is configured to open the furnace aperture in connection with moving the second moving means of the process monitoring unit with the first moving means into the second position and so that the hatch mechanism is configured to close the furnace aperture in connection with moving the second moving means of the process monitoring unit with the first moving means from the second position.

14. The arrangement according to claim 12, wherein
the second moving means is configured to move the first moving means between the first position and the second position by rotating.

15. The arrangement according to claim 12, wherein
said plurality of linearly movable monitoring devices of the process monitoring unit comprises a linearly movable monitoring device comprising at least one of a thermometer or an optical pyrometer configured to measure the temperature of the furnace melt in the furnace space.

16. The arrangement according to claim 12, wherein
said plurality of linearly movable monitoring devices of the process monitoring unit comprises a linearly movable monitoring device comprising a sampling chamber configured to measure the liquidus temperature of the furnace melt in the furnace space.

17. The arrangement according to claim 12, wherein
said plurality of linearly movable monitoring devices of the process monitoring unit comprises a linearly movable monitoring device comprising a sounding rod configured to measure the level of the furnace melt in the furnace space.

18. The arrangement according to claim 12, wherein
said plurality of linearly movable monitoring devices of the process monitoring unit comprises a linearly movable monitoring device comprising a camera configured to take pictures inside the furnace space.

19. The arrangement according to claim 12, wherein
said plurality of linearly movable monitoring devices of the process monitoring unit comprises a linearly movable monitoring device configured to take dust samples from the furnace space.

20. The arrangement according to claim 12, wherein
said plurality of linearly movable monitoring devices of the process monitoring unit comprises a linearly movable monitoring device configured to take melt samples from the furnace melt inside the furnace space.

21. The arrangement according to claim 12, wherein
said plurality of linearly movable monitoring devices of the process monitoring unit comprises a linearly movable monitoring device configured to take gas samples from the furnace space.

22. The arrangement according to claim 12, wherein
the process monitoring unit comprises a linearly movable injection device configured to inject at least one additive selected from the group consisting of coke, pulverized coal, concentrate mixture, silica, lime, and limestone into the furnace melt inside the furnace space.

* * * * *